United States Patent [19]
Yamamoto

[11] Patent Number: 5,146,260
[45] Date of Patent: Sep. 8, 1992

[54] LENS BARREL

[75] Inventor: Hiroshi Yamamoto, Kanagawa, Japan

[73] Assignee: Canon Kabushiki Kaisha, Tokyo, Japan

[21] Appl. No.: 701,371

[22] Filed: May 13, 1991

Related U.S. Application Data

[63] Continuation of Ser. No. 612,809, Nov. 9, 1990, abandoned.

Foreign Application Priority Data

Nov. 14, 1989 [JP] Japan .................................. 1-296784

[51] Int. Cl.⁵ .................................................. G03B 3/00
[52] U.S. Cl. .................................... 354/400; 354/195.1
[58] Field of Search ........... 354/195.1, 195.11, 195.12, 354/195.13, 400–409, 270, 272; 358/227; 359/823, 696, 697, 698, 705, 706, 739, 740

[56] References Cited

U.S. PATENT DOCUMENTS

| | | | |
|---|---|---|---|
| 4,320,947 | 3/1982 | Komine | 354/408 |
| 4,404,595 | 9/1983 | Ushiro et al. | 358/227 |

Primary Examiner—L. T. Hix
Assistant Examiner—Howard Blankenship
Attorney, Agent, or Firm—Robin, Blecker, Daley & Driscoll

[57] ABSTRACT

A lens barrel having a focusing lens and a zooming lens comprises a focusing motor which serves as a drive source for moving the focusing lens; and a zooming motor which serves as a drive source for moving the zooming lens. In the lens barrel, the output shafts of the two motors are located between a diaphragm unit and a focal plane and extend approximately perpendicularly to an optical axis; a focusing transmission shaft is arranged in parallel to the optical axis in such a way as to transmit the rotation of the output shaft of the focusing motor to a focusing lens holding part; and a zooming transmission shaft is arranged also in parallel to the optical axis to transmit the rotation of the output shaft of the zooming motor to a zooming lens holding part.

55 Claims, 7 Drawing Sheets

LENS BARREL

This is a continuation application under 37 CFR 1.62 of prior application Ser. No. 612,809, filed Nov. 9, 1990, now abandoned.

BACKGROUND OF THE INVENTION

1. Field of the Invention

This invention relates to a lens barrel having focusing and zooming motors.

2. Description of the Related Art

The actuators (motors) provided for driving the lens barrel of a compact video camera in focusing and zooming the lens have been disposed at a position where the optically designed lens diameter is small. More specifically, they have been disposed between a diaphragm position and an optical focus position (sensor position) for the purpose of minimizing the outside diameter of the whole lens barrel. Generally, compact DC motors which are employed as the lens driving actuators within the lens barrel of this type are arranged to have their output shafts in parallel to the optical axis of the lens. A reduction gear mechanism is formed by arranging a plurality of spur gears between the output shaft of each of the motors and a focusing-lens or zoom-lens holding tube which is arranged to be driven by the motor.

The diaphragm unit used for the lens barrel of a compact video camera or the like generally consists of a thin cuboid diaphragm mechanism which has a minimal necessary number of blades (two, in most cases) and a driving part which has a braking coil. The diaphragm unit is optically designed to be disposed near the middle part of the lens unit of the lens barrel in general. The layout of the whole lens barrel is as follows: With the diaphragm unit disposed near the middle part of the lens unit, each of the lens driving motors is arranged between the diaphragm unit and an optical focal plane in a small outside diameter part of the lens unit with its output shaft in parallel to the optical axis. Meanwhile, the focusing-lens holding tube and the zoom-lens holding tube which are to be driven by the motors are disposed in front of the diaphragm unit (as viewed on the optical axis). Generally, therefore, the reduction gear mechanism which is provided for reducing the output speed of the lens driving motor is arranged to extend toward the fore end of the lens unit, passing a part near the periphery of the diaphragm unit. The reduction gear mechanism thus engages a large gear disposed on the outer or inner circumferential part of each of the lens holding tubes or transmission tubes. The rotating force of the motor is used for moving the applicable lens through known helicoid and cam mechanisms in the optical axis direction for focusing (focus adjustment) or zooming (power varying).

In accordance with the arrangement of the conventional lens barrel, however, the reduction gear mechanism becomes complex and requires a large space. Besides, the size of the motor is large. Therefore, it has been difficult to make the lens barrel in a compact size and at a low cost. Meanwhile, there is a strong desire for further reduction in size of the video camera. Hence, the size of the lens barrel is also desired to be minimized.

SUMMARY OF THE INVENTION

It is one aspect of this invention to provide a lens barrel which is designed to permit use of a worm gear by arranging the output shafts of both focusing and zooming motors to extend perpendicularly to an optical axis.

The above and further aspects and features of the invention will become apparent from the following detailed description of embodiment thereof taken in connection with the accompanying drawings.

DETAILED DESCRIPTION OF THE PREFERRED EMBODIMENTS

Figure 1:
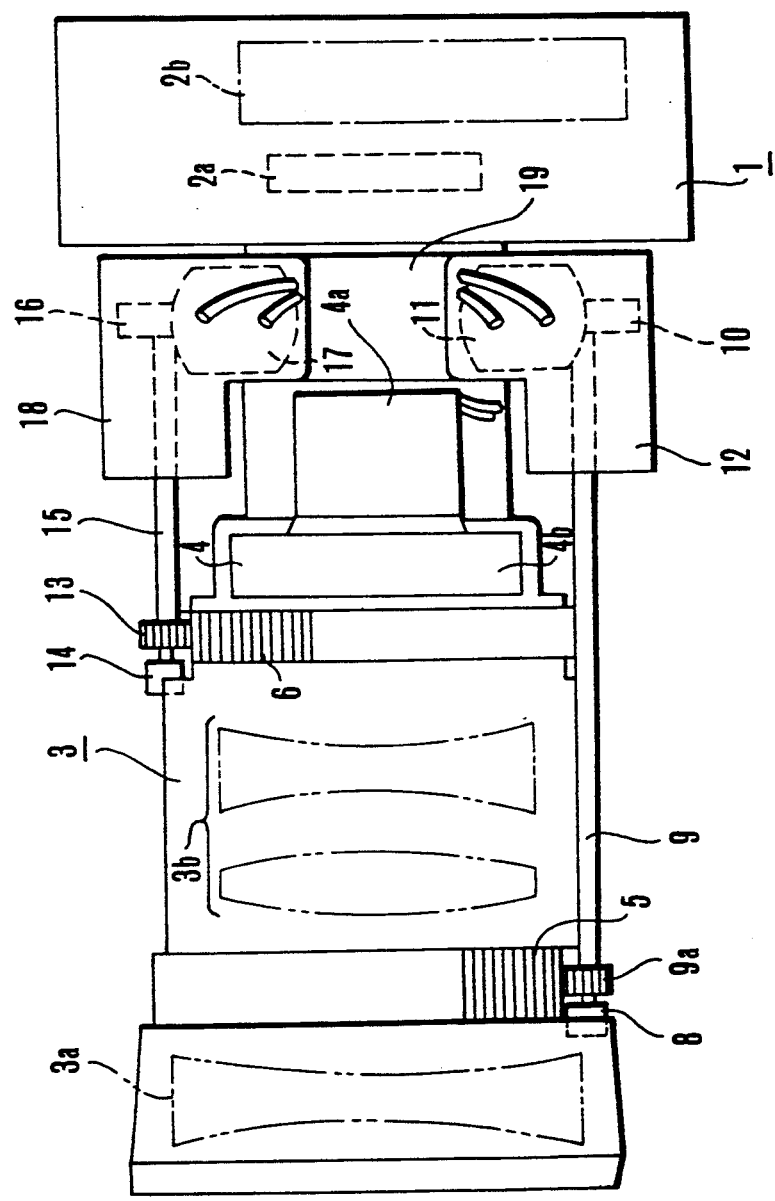
FIG. 1 is a plan view showing a lens barrel of a video camera which is arranged according to this invention as a first embodiment thereof.

FIG. 1 shows a lens barrel arranged according to this invention as a first embodiment thereof, the lens barrel being shown as viewed from a direction perpendicular to the optical axis of the lens. In FIG. 1, a reference numeral 1 denotes an image sensing unit which includes an image sensor 2a and a processing circuit 2b. The image sensor 2a is disposed on the focal plane of an optical system.

A lens barrel body 3 is arranged to carry a diaphragm unit 4 and has the above-stated image sensing unit secured thereto. A diaphragm driving actuator part 4a includes therein a meter, a motor, etc. A diaphragm mechanism part 4b is arranged to move diaphragm blades. A large gear 5 for focus driving and a large gear 6 for zoom driving are rotatably mounted on the lens barrel body 3. The large gears 5 and 6 are arranged to move a focusing lens 3a and a zoom lens 3b in the direction of the optical axis by using known helicoid and cam mechanisms respectively. A focus driving small gear 9a engages the focus driving large gear 5. A bearing 8 is arranged to bear a transmission shaft 9 which is arranged in one unified body with the small gear 9a. A worm wheel 10 is secured coaxially to the transmission shaft 9 and engages a worm 11a secured to the output shaft of a motor 11, which extends in a direction perpendicular to the optical axis. A gear box 12 is arranged to have the worm wheel 10, the worm 11a and the motor 11 secured thereto as one unitized part. The gear box is characterized in that it is made of a resin material containing an electromagnetic wave absorbing material which produces no electrical noise exteriorly thereof. Meanwhile, an arrangement for driving the zoom lens 3b for zooming includes a zoom driving small gear 13; a bearing 14 for a shaft 15 which is arranged in one body with the small gear 13; and a worm wheel 16 which is secured to the shaft 15 and is arranged in one body with the latter. A motor 17 has a worm 17a secured to the output shaft thereof. A gear box 18 is arranged to unitize the motor 17, the worm wheel 16 and the worm 17a. The gear boxes 12 and 18 are formed in one body by means of a member 19. The large gears 5 and 6 are disposed apart from each other in the direction of the optical axis. Therefore, the positions of the small gears 9a and 13 are located also apart from each other in the optical axis direction in such a way as to prevent the lens barrel diameter from increasing.

Figure 2:
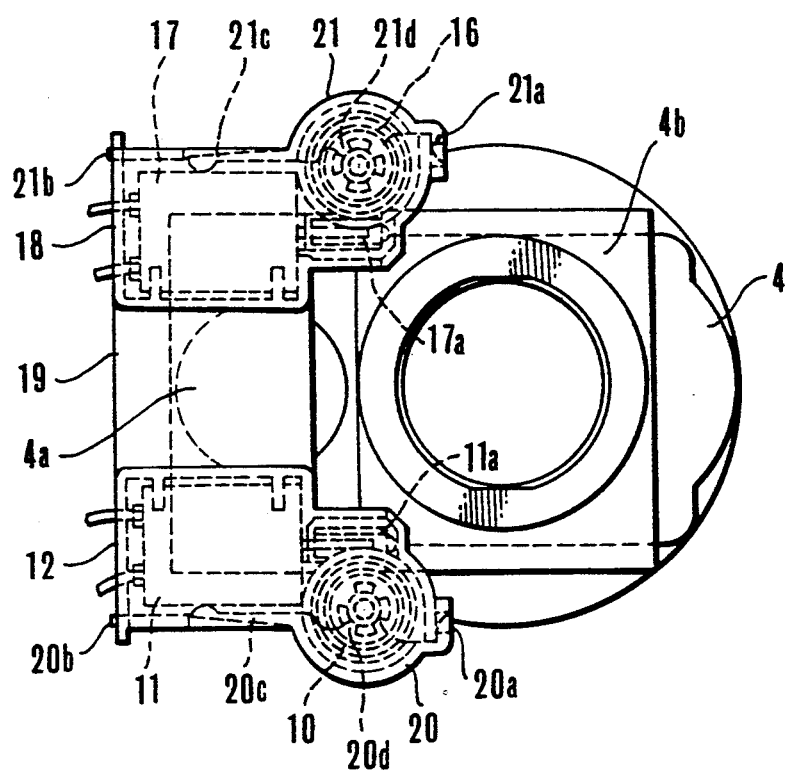
FIG. 2 is a right side view of the lens barrel shown in FIG. 1.

FIG. 2 is a side view showing the lens barrel as viewed from the right-hand side thereof. The image sensing unit 1 is omitted from the illustration. A case cover 20 is fitted onto the gear box 12 by means of its hook parts 20a and 20b. In fitting the cover 20, the motor 11 is pushed by an elastic part 20c of the case cover 20 and, at the same time, the transmission shaft 9 is held in position by a retaining part 20d thereof. The gear boxes 12 and 18 which are unified into one body by means of the member 19 are secured through an elastic member to the lens barrel body 3 by known means such as snap fitting, screws, etc.

Figure 3:
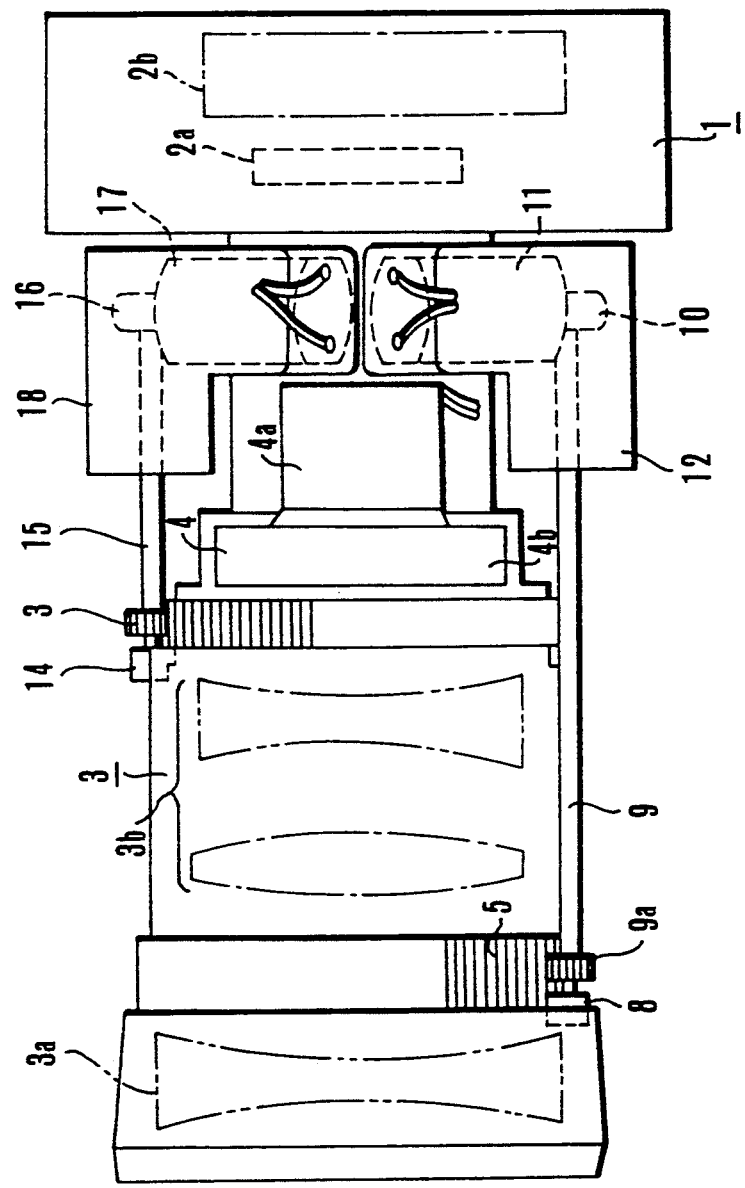
FIG. 3 is a plan view showing a lens barrel of a video camera which is arranged as a second embodiment of the invention.
Figure 4:
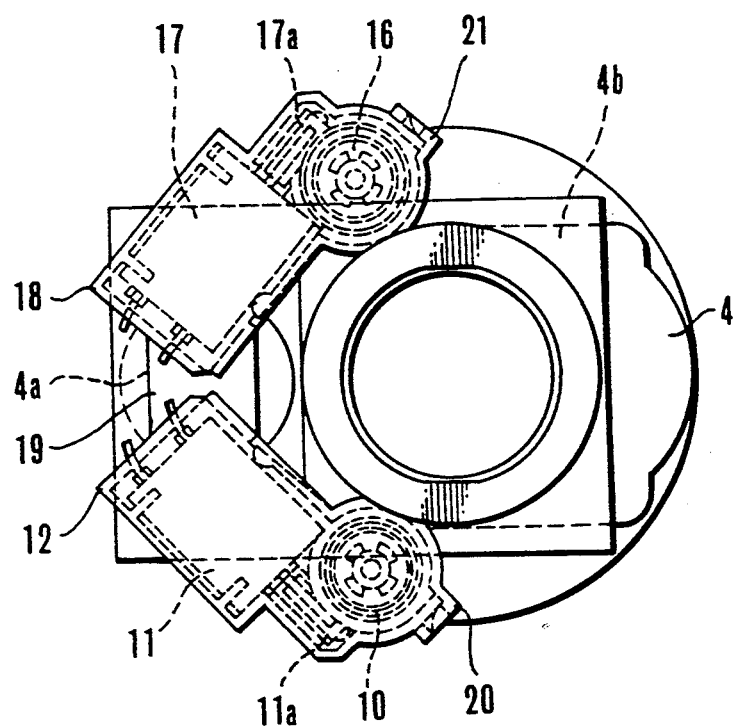
FIG. 4 is a right side view of the lens barrel shown in FIG. 3.

FIGS. 3 and 4 show a second embodiment of the invention. In this case, the layout of the motors 11 and 17 described above with reference to FIGS. 1 and 2 is changed as follows: While the output shafts of the two motors are arranged to be in parallel to each other in the first embodiment shown in FIGS. 1 and 2, they are arranged, in the case of the second embodiment, in an L shape to have their output shafts in intersecting directions.

In the case of the second embodiment, the protruding extents of the two motors 11 and 17 are lessened and they are arranged substantially around the optical axis. This enables the lens barrel to be shaped closer to a right circular cylinder shape. In the case of a video camera, the lens barrel is generally secured to the camera body. Therefore, the external shape of the lens barrel itself does not present any serious problem. However, in the case of an interchangeable lens system, it is important, in terms of operability, that the lens barrel shape is close to a right circular cylinder.

In both the first and second embodiments, the motors 11 and 17 are arranged to overlap with the actuator part 4a of the diaphragm unit 4 in the direction of the optical axis. This arrangement is advantageous for reduction in size of the whole lens barrel, because the actuator part 4a is protruding in the direction of diameter. With the space which is occupied by the motors 11 and 17 arranged to overlap with this protruding part in the optical axis direction, a diametral protrusion which otherwise results singly from the arrangement of the motors 11 and 17 is avoided. In cases where the motors 11 and 17 are arranged approximately perpendicularly to the optical axis like in the case of the embodiment, any diametral protrusion by the motors is especially undesirable. Whereas, the above-stated arrangement of the embodiment effectively solves this problem.

Figure 5:
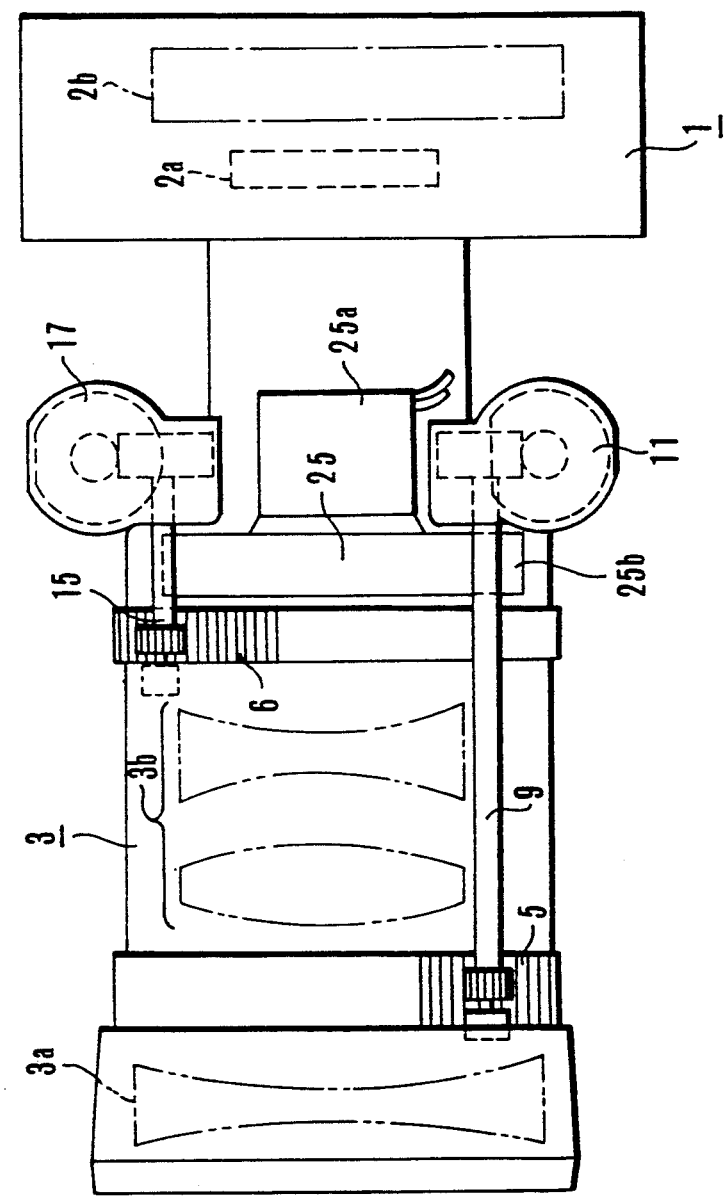
FIG. 5 is a plan view showing a lens barrel of a video camera which is arranged as a third embodiment of the invention.
Figure 6:
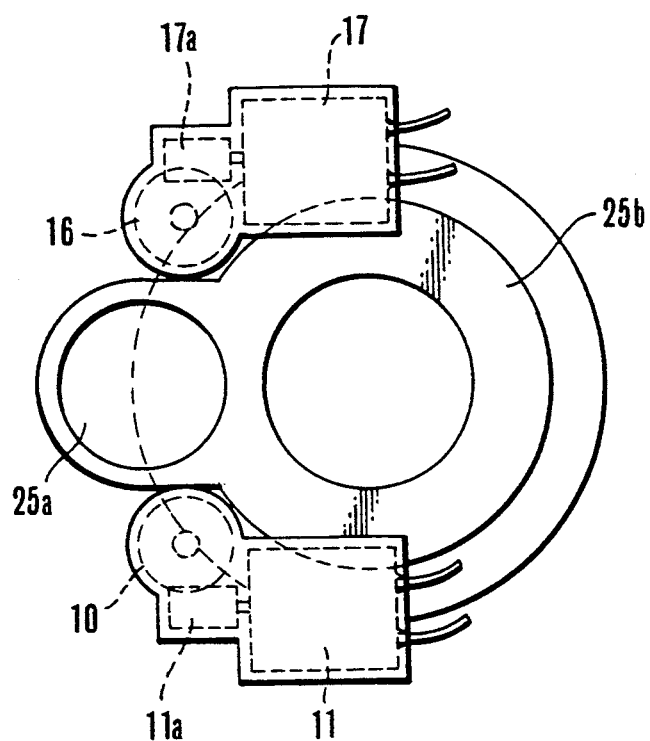
FIG. 6 is a right side view of the lens barrel shown in FIG. 5.

FIGS. 5 and 6 show a third embodiment. In the case of the third embodiment, the diaphragm unit 25 is arranged in an 8-like shape. The diaphragm unit 25 is a diaphragm mechanism of an iris type consisting of three or more blades in this case. The diaphragm unit 25 consists of a diaphragm driving actuator part 25a which includes a meter, a motor, etc., and a diaphragm mechanism part 25b which are arranged to move the iris blades. The motors 11 and 17 are disposed to overlap with the diaphragm mechanism part 25b in the direction of the optical axis.

Figure 7:
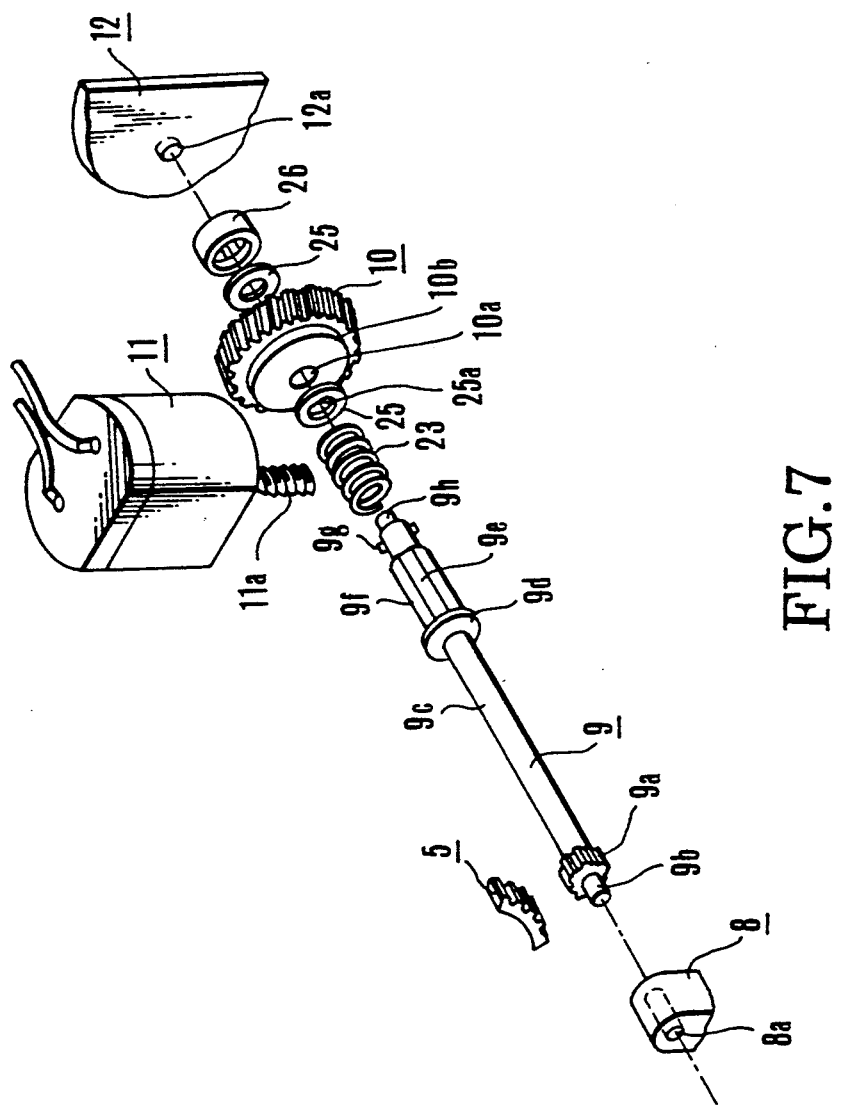
FIG. 7 is an oblique exploded view showing a reduction gear mechanism provided for lens driving.

FIG. 7 is an oblique exploded view showing the details of the reduction gear mechanism using the worm gear in the above-stated embodiment. The transmission shaft 9 has its ends 9b and 9h rotatably carried respectively by a bearing hole 8a which is provided in the bearing 8 provided on the lens barrel body 3 and a bearing hole 12a which is provided in the gear box 12. The transmission shaft 9 which is made of a resin material is provided with a small gear 9a which engages a driven gear 5; a spring retaining part 9d; a D cut part 9e which is provided for non-rotatably engaging the rotation preventing part 25a of a sliding ring 25; and a claw 9g which bayonet-fittingly engages a gear retaining ring 26. These parts are formed in one body with the shaft 9. A spring 23 is arranged to push the sliding ring 25 against the end face 10b of a worm wheel 10. A worm 11a which is secured to the output shaft of the motor 11 engages the worm wheel 10. The above description covers the focus driving system. The zoom driving system is arranged in the same manner and is, therefore, omitted from description. The operation of the embodiment is as described below:

A current is supplied to the motor 11 to rotate the worm 11a according to a signal relative to focusing. The worm wheel 10 which engages the worm 11a then causes the sliding ring 25 to rotate by a frictional force obtained through the pressing contact caused by the spring 23. The sliding ring 25 has a rotation preventing part 25a the shape of which coincides with the D cut part 9e of the transmission shaft 9. Therefore, this part 9e then imparts a rotating force to the transmission shaft 9. This sliding mechanism serves as a transmission force absorbing mechanism in the event of a manual operation. The rotating force of the transmission shaft 9 is transmitted to the small gear 9a. This causes the focusing lens driving large gear 5 to rotate. The rotation of the large gear 5 moves the focusing lens 3a in the direction of the optical axis for focus adjustment. A zooming action is also performed in the same manner and, therefore, is omitted from description.

Further, with the motors so arranged in this embodiment, their electric terminal parts are located away from the image sensing unit 1. Therefore, the internal circuit 2b of the image sensing unit 1 is affected to a lesser degree by the electrical noise.

In the case of the embodiment which involves a lens barrel of the kind having the two motors, one for focusing and the other for zooming, the output shafts of the two motors are arranged approximately perpendicularly to the optical axis between the optical focal plane and the diaphragm unit which has some room to share in the diametral direction. This permits reduction in size of the lens barrel. Further, since each motor output shaft extends approximately in the diametral direction (approximately perpendicular to the optical axis), the arrangement enables the embodiment to have a reduction gear mechanism using a worm which is advantageous on account of its low noise level. Therefore, a large reduction ratio is easily obtainable with a less number of parts.

Further, in the embodiment described, the two motors are arranged such that, when the diaphragm unit which has its driving part arranged in a position deviating in the diametrical direction is used, the two motors overlap with the driving part in the direction of the optical axis. This arrangement enables the lens barrel to have a less degree of protrusion in its diametral direction. Further, in the embodiment, the motors 11 and 17 which generate electrical noises are encompassed with the gear boxes 12 and 18 which are made of a resin material in which an electromagnetic wave absorbing material is mixed. These gear boxes effectively prevent the image sensor 2a and the processing circuit 2b from being affected by the electrical noises.

The diaphragm unit 4 includes the driving part and the two motors 11 and 17 gathered in one place in the case of the embodiment. Therefore, the electric wiring length required for assembly work can be shortened.

In addition, in the embodiments shown in FIGS. 4 and 6, a worm which is rotated by the output of a motor and a gear which meshes with the worm are positioned in such a manner that the gear (for example, worm wheel 10) and the transmission shaft (for example transmission shaft 9) are disposed on the radially inner side of the lens barrel with respect to the worm (for example, worm 11a), so that the size of the lens barrel can be further minimized.

What is claimed is:

1. A lens barrel having a focusing lens and a zooming lens, comprising:
   a) a focusing motor arranged to serve as a drive source for moving said focusing lens;
   b) a zooming motor arranged to serve as a drive source for moving said zooming lens;
   c) a diaphragm unit, output shafts of, said two motors being located between a diaphragm blade of said diaphragm unit and an optical focal plane and extending perpendicular to an optical axis;
   d) a focusing transmission shaft arranged in parallel to said optical axis in such a way as to transmit the rotation of the output shaft of said focusing motor to a lens holding part arranged to hold said focusing lens; and
   e) a zooming transmission shaft arranged in parallel to said optical axis in such a way as to transmit the rotation of the output shaft of said zooming motor to a lens holding part arranged to hold said zooming lens.

2. A lens barrel according to claim 1, wherein each of said output shafts and the respective one of said transmission shafts are coupled with each other through a gear mechanism which includes a worm.

3. A lens barrel according to claim 2, further comprising a holding member which unitizes one of said motors and said worm, said holding member being arranged to rotatably carry one end of each of said transmission shafts.

4. A lens barrel according to claim 1, wherein said two motors are arranged to have said two output shafts approximately in parallel to each other.

5. A lens barrel according to claim 1, wherein said two motors have their two output shafts arranged approximately around said optical axis.

6. A lens barrel according to claim 5, wherein said two motors are arranged in positions which overlap with a driving part of said diaphragm unit in the direction of said optical axis.

7. A lens barrel having a focusing lens and a zooming lens, comprising:
   a) a focusing motor arranged to serve as a drive source for moving said focusing lens;
   b) a zooming motor arranged to serve as a drive source for moving said zooming lens;
   c) a diaphragm unit having a driving part disposed in a position deviating therefrom in the diametral direction of said lens barrel, two output shafts of said two motors being arranged to extend approximately perpendicularly to an optical axis between a diaphragm blade of said diaphragm unit and an optical focal plane, and said two motors being disposed to overlap with the driving part of said diaphragm unit in the direction of said optical axis; and
   e) a plurality of transmission shafts arranged in parallel to said optical axis in such a way as to receive the rotation of said output shafts respectively, the rotation of said plurality of transmission shafts being used for moving said focusing lens and said zooming lens in the direction of said optical axis.

8. A lens barrel according to claim 7, wherein each of said output shafts and the respective one of said transmission shafts are coupled with each other through a gear mechanism which includes a worm.

9. A lens barrel according to claim 8, wherein said two motors are arranged to have said two output shafts approximately in parallel to each other.

10. A lens barrel according to claim 4, wherein said two motors are disposed at their respective positions which are opposite to each other at intervals of approximately 180 degrees on the radially outer side of said diaphragm unit.

11. A lens barrel according to claim 4, wherein said two motors are disposed at their respective positions which are opposite to each other at intervals of approximately 180 degrees on the radially outer side of a driving part in said diaphragm unit.

12. A lens barrel according to claim 2, wherein at least one of said transmission shafts is disposed on the radially inner side of said lens barrel with respect to said worm.

13. A lens barrel according to claim 7, wherein said two motors are disposed, at their respective positions which are opposite to each other at intervals of approximately 180 degrees on the radially outer side of said diaphragm unit.

14. A lens barrel according to claim 9, wherein said two motors are disposed at their respective positions which are opposite to each other at intervals of approximately 180 degrees on the radially outer side of a driving part in said diaphragm unit.

15. A lens barrel according to claim 8, wherein at least one of said transmission shafts is disposed on the radially inner side of said lens barrel with respect to said worm.

16. An optical apparatus having a focusing lens and a zooming lens, comprising:
   a) a focusing motor arranged to serve as a drive source for moving said focusing lens;
   b) a zooming motor arranged to serve as a drive source for moving said zooming lens;
   c) a diaphragm unit, output shafts of said two motors being located between a diaphragm blade of said diaphragm unit and an optical focal plane and extending perpendicularly to an optical axis;
   d) a focusing transmission shaft arranged in parallel to said optical axis in such a way as to transmit the rotation of the output shaft of said focusing motor to a lens holding part arranged to hold said focusing lens; and
   e) a zooming transmission shaft arranged in parallel to said optical axis in such a way as to transmit the rotation of the output shaft of said zooming motor to a lens holding part arranged to hold said zooming lens.

17. An optical apparatus according to claim 16, wherein each of said output shafts and the respective one of said transmission shafts are coupled with each other through a gear mechanism which includes a worm.

18. An optical apparatus according to claim 17, further comprising a holding member which unitizes one of said motors and said worm, said holding member being arranged to rotatably carry one end of each of said transmission shafts.

19. An optical apparatus according to claim 16, wherein said two motors are arranged to have said two output shafts approximately in parallel to each other.

20. An optical apparatus according to claim 16, wherein said two motors have their two output shafts arranged approximately around said optical axis.

21. An optical apparatus according to claim 20, wherein said two motors are arranged in positions which overlap with a driving part of said diaphragm unit in the direction of said optical axis.

22. An optical apparatus having a focusing lens and a zooming lens, comprising:
   a) a focusing motor arranged to serve as a drive source for moving said focusing lens;
   b) a zooming motor arranged to serve as a drive source for moving said zooming lens;
   c) a diaphragm unit having a driving part disposed in a position deviating therefrom in the diametral direction of said lens barrel, two output shafts of said two motors being arranged to extend approximately perpendicularly to an optical axis between a diaphragm blade of said diaphragm unit and an optical focal plane, and said two motors being disposed to overlap with the driving part of said diaphragm unit in the direction of said optical axis; and
   e) a plurality of transmission shafts arranged in parallel to said optical axis in such a way as to receive the rotation of said output shafts respectively, the rotation of said plurality of transmission shafts being used for moving said focusing lens and said zooming lens in the direction of said optical axis.

23. An optical apparatus according to claim 22, wherein each of said output shafts and the respective one of said transmission shafts are coupled with each other through a gear mechanism which includes a worm.

24. An optical apparatus according to claim 23, wherein said two motors are arranged to have said two output shafts approximately in parallel to each other.

25. An optical apparatus according to claim 19, wherein said two motors are disposed at their respective positions which are opposite to each other at intervals of approximately 180 degrees on the radially outer side of said diaphragm unit.

26. An optical apparatus according to claim 19, wherein said two motors are disposed at their respective positions which are opposite to each other at intervals of approximately 180 degrees on the radially outer side of a driving part in said diaphragm unit.

27. An optical apparatus according to claim 17, wherein at least one of said transmission shafts is disposed on the radially inner side of said lens barrel with respect to said worm.

28. An optical apparatus according to claim 22, wherein said two motors are disposed at their respective positions which are opposite to each other at intervals of approximately 180 degrees on the radially outer side of said diaphragm unit.

29. An optical apparatus according to claim 24, wherein said two motors are disposed at their respective positions which are opposite to each other at intervals of approximately 180 degrees on the radially outer side of a driving part in said diaphragm unit.

30. An optical apparatus according to claim 16, further comprising:
   an image sensor; and
   a processing circuit provided for said image sensor.

31. An optical apparatus according to claim 17, further comprising:
   an image sensor; and
   a processing circuit provided for said image sensor.

32. An optical apparatus according to claim 22, further comprising:
   an image sensor; and
   a processing circuit provided for said image sensor.

33. An optical apparatus according to claim 23, further comprising:
   an image sensor; and
   a processing circuit provided for said image sensor.

34. A lens barrel having a focusing lens and a zooming lens comprising:
   a) a focusing motor arranged to serve as a drive source for moving said focusing lens;
   b) a zooming motor arranged to serve as a drive source for moving said zooming lens;
   c) output shafts of said two motors extending perpendicularly to an optical axis,
      said two motors being arranged at an almost same position in the direction of the optical axis, and
   said output shafts of said two motors transmitting the rotation to transmission members having a rotation axis line parallel to the optical axis by means of a gear mechanism having a worm gear.

35. A lens barrel according to claim 34, wherein said two motors are arranged to have said two output shafts approximately in parallel to each other.

36. A lens barrel according to claim 34, further comprising a diaphragm unit.

37. A lens barrel according to claim 34, wherein said two motors are arranged near said diaphragm unit.

38. A lens barrel according to claim 34, wherein one of said transmission members is arranged to transmit the rotation of the output shaft of said focusing motor to a focusing lens holding part, and another of said transmission members is arranged to transmit the rotation of the output shaft of said zooming motor to a zooming lens holding part.

39. A lens barrel according to claim 34, wherein said output shaft of said two motors protrude on the same side.

40. An optical apparatus having a focusing lens and a zooming lens, comprising:
   a) a focusing motor arranged to serve as a drive source for moving said focusing lens;
   b) a zooming motor arranged to serve as a drive source for moving said zooming lens;
   c) a diaphragm unit, output shafts of, said two motors being located between a diaphragm blade of said diaphragm unit and an optical focal plane and extending perpendicular to an optical axis;
   d) a focusing transmission shaft arranged in parallel to said optical axis in such a way as to transmit the rotation of the output shaft of said focusing motor to a lens holding part arranged to hold said focusing lens; and
   e) a zooming transmission shaft arranged in parallel to said optical axis in such a way as to transmit the rotation of the output shaft of said zooming motor to a lens holding part arranged to hold said zooming lens.

41. An optical apparatus according to claim 40, wherein said two motors are arranged to have said two output shafts approximately in parallel to each other.

42. An optical apparatus according to claim 40, further comprising a diaphragm unit, 43. An optical apparatus according to claim 40, wherein said two motors are arranged near said diaphragm unit.

44. An optical apparatus according to claim 40, wherein said output shaft of said two motors protrude on the same side.

45. An optical apparatus according to claim 40, further comprising:
   an image sensor; and
   a processing circuit provided for said image sensor.

46. A lens barrel having a focusing lens and a zooming lens, comprising:
   a) a focusing motor arranged to serve as a drive source for moving said focusing lens;
   b) a zooming motor arranged to serve as a drive source for moving said zooming lens;
   c) output shafts of said two motors extending perpendicularly to an optical axis,
   said two motors being arranged at an almost same position in the direction of the optical axis,
   d) a diaphragm unit, said two motors being arranged near said diaphragm unit, and said output shafts of said two motors transmitting the rotation to transmission members having a rotation axis line parallel to the optical axis by means of a gear mechanism having a worm gear.

47. A lens barrel according to claim 46, wherein said two motors are arranged to have said two output shafts approximately in parallel to each other.

48. A lens barrel according to claim 46, further comprising a first transmission member arranged to transmit the rotation of the output shaft of said focusing motor to a focusing lens holding part, and a second transmission member arranged to transmit the rotation of the output shaft of said zooming motor to a zooming lens holding part.

49. A lens barrel according to claim 46, wherein said output shafts of said two motors protrude on the same side.

50. An optical apparatus having a focusing lens and a zooming lens, comprising:
   a) a focusing motor arranged to serve as a drive source for moving said focusing lens;
   b) a zooming motor arranged to serve as a drive source for moving said zooming lens;
   c) output shafts of said two motors extending perpendicularly to an optical axis,
   d) a diaphragm unit, said two motors being arranged near said diaphragm unit, and said output shafts of said two motors transmitting the rotation to transmission members having a rotation axis line parallel to the optical axis by means of a gear mechanism having a worm gear.

51. An optical apparatus according to claim 50, wherein said two motors are arranged to have said two output shafts approximately in parallel to each other.

52. An optical apparatus according to claim 50, further comprising a flat transmission member arranged to transmit the rotation of the output shaft of said focusing motor to a focusing lens holding part, and a second transmission member arranged to transmit the rotation of the output shaft of said zooming motor to a zooming lens holding part.

53. An optical apparatus according to claim 52, wherein said first and second transmission members have a rotation axis line parallel to the optical axis.

54. An optical apparatus according to claim 50, wherein said output shafts of said two motors protrude on the same side.

55. An optical apparatus according to claim 50, further comprising:
   an image sensor; and
   a processing circuit provided for said image sensor.

* * * * *

UNITED STATES PATENT AND TRADEMARK OFFICE
CERTIFICATE OF CORRECTION

PATENT NO. : 5,146,260
DATED : September 8, 1992
INVENTOR(S) : Hiroshi Yamamoto It is certified that error appears in the above-identified patent and that said Letters Patent is hereby corrected as shown below:

```
Col. 4, lines 56 and 64.  Change "less" to -- lesser --
                                  (second occurrence)
Col. 5, line 24.  Delete ","
Col. 5, line 27.  Change "perpendicular" to -- perpendicularly --
Col. 8, line 39.  Change "34" to -- 36 --
Col. 8, line 57.  Delete "," (second occurrence)
Col. 8, line 60.  Change "perpendicular" to -- perpendicularly --
Col. 9, line 8.  Change "40" to -- 42--
```

Signed and Sealed this

Twelfth Day of October, 1993

*Attest:*

BRUCE LEHMAN

*Attesting Officer*  *Commissioner of Patents and Trademarks*